A. S. KROTZ.
COMBINED INTAKE AND EXHAUST MANIFOLD.
APPLICATION FILED MAY 27, 1921.

1,434,353. Patented Oct. 31, 1922.
2 SHEETS—SHEET 1.

Inventor:
Alvaro S. Krotz
By his Attorneys:

Witness:

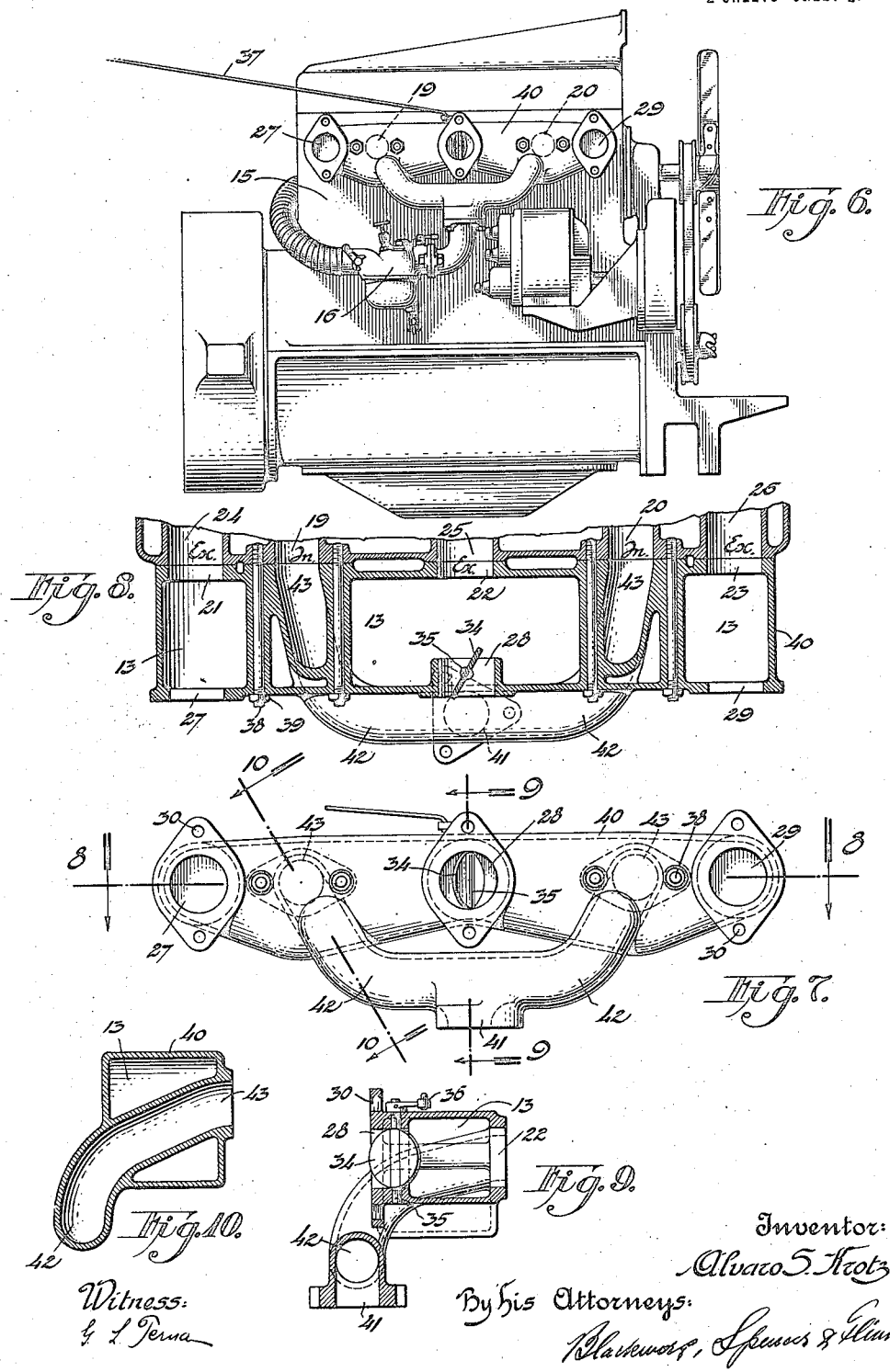

Patented Oct. 31, 1922.

1,434,353

UNITED STATES PATENT OFFICE.

ALVARO S. KROTZ, OF JANESVILLE, WISCONSIN, ASSIGNOR TO GENERAL MOTORS CORPORATION, OF DETROIT, MICHIGAN, A CORPORATION OF DELAWARE.

COMBINED INTAKE AND EXHAUST MANIFOLD.

Application filed May 27, 1921. Serial No. 472,975.

*To all whom it may concern:*

Be it known that I, ALVARO S. KROTZ, a citizen of the United States, and a resident of Janesville, county of Rock, and State of Wisconsin, have invented certain new and useful Improvements in Combined Intake and Exhaust Manifolds, of which the following is a full, clear, concise, and exact description, such as will enable others skilled in the art to which the invention relates to make and use the same, reference being made therein to the accompanying drawings, which form a part of this specification.

My invention relates to combined intake and exhaust manifolds for use with internal combustion engines designed to operate upon a fuel which requires the application of a considerable quantity of heat to the mixture of air and fuel formed by the carburetor in order to insure satisfactory operation of the engine, such, for example, as engines designed to utilize alcohol, kerosene and similar hydrocarbons or substances.

In operating an internal combustion engine with fuels of the class above referred to although the combustible mixture has to be heated to a comparatively high temperature, it is nevertheless desirable that the mixture shall not be heated to a higher temperature than is necessary to properly vaporize the fuel; as otherwise the quantity of fuel passing to the engine is reduced, because of the increase in volume due to the high temperature of the mixture, and the volumetric efficiency of the engine is correspondingly reduced. It is also desirable, in engines of the class referred to, to reduce and control the heating of the combustible mixture after the engine has been started, and after it has become heated up and is in operation, to thereby maintain as large a mass of mixture passing to the engine as is consistent with a satisfactory vaporization of the fuel.

The principal object of my invention is to provide a combined intake and exhaust manifold having features of construction and operation whereby a sufficient heating effect by exhaust gas from the engine may be secured at starting to accomplish a proper vaporization of the fuel, and wherein the heating action may be reduced after the engine is in operation and has become heated; to thereby avoid heating of the mixture to a temperature higher than is necessary after the engine is in operation and during the continued operation thereof. Incidentally, the means for regulating the heating effect may be employed during the normal operation of the engine for controlling the flow of exhaust gas and the heat imparted by it to the inflowing combustible mixture, to thereby maintain at all times proper vaporization of the fuel.

A further object of my invention is to provide a combined intake and exhaust manifold wherein the exhaust gas whereby the heating is accomplished may be caused to flow past a supply conduit through which the combustible mixture flows to the engine at starting, or when it is necessary to heat the said mixture; whereas at other times, or after the engine has become heated up and is in operation, the flow of exhaust gas may be diverted in such a manner as to materially reduce, and in fact to substantially interrupt the flow of exhaust gas past the said supply conduit and the heating of the mixture.

A further object of my invention is to provide an improved combined intake and exhaust manifold of simple construction, so that the same may be readily made from cast metal by approved manufacturing processes; and wherein the heating effect of the exhaust gas flowing through said manifold upon the inflowing combustible mixture may be varied at will by the operator of the engine to thereby maintain a proper temperature of and secure proper vaporization of the fuel at all times.

The drawings accompanying and forming a part of this application show two equally effective and efficient forms of combined intake and exhaust manifold, both coming within the scope of my invention; although it will be appreciated that my invention may be embodied in various other specific forms, and that the same includes all such variations and modifications of the particular forms illustrated as come within the scope of the concluding claims wherein the distinguishing features in which my invention consists are particularly pointed out.

Referring now to the drawings:

Figure 6 is a view similar to Figure 1 but showing the engine as equipped with a slightly modified form of combined intake and exhaust manifold also included in my invention.

Figure 7 is a view upon a larger scale showing the manifold alone in side elevation.

Figure 8 is a view showing a section upon a horizontal plane indicated by the line 8—8, Figure 7.

Figure 9 is a view showing a section upon a transverse plane indicated by the line 9—9, Figure 7.

Figure 10 is a view showing a section upon a transverse inclined plane indicated by the line 10—10, Figure 7.

Figure 1:
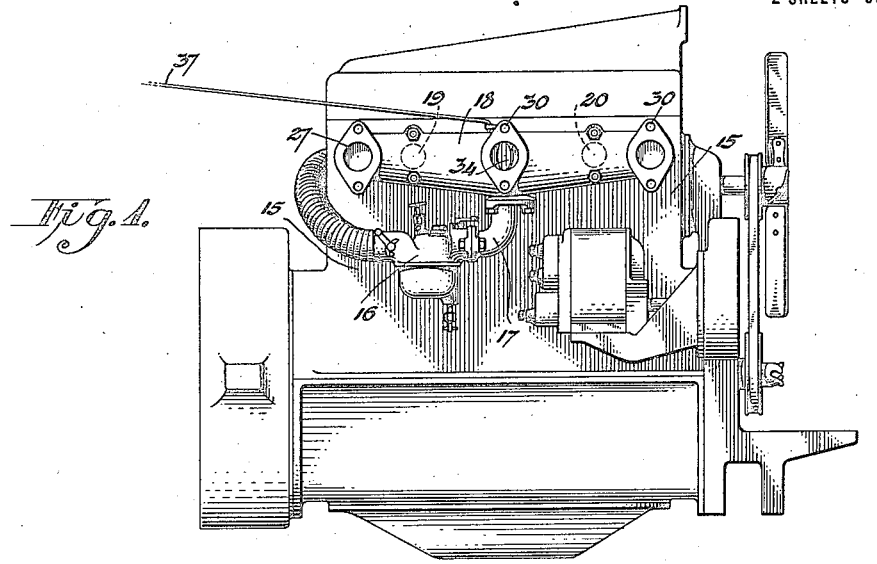
Figure 1 is a view showing an internal combustion engine in side elevation and equipped with my invention, the engine illustrated being a multiple cylinder engine having four working cylinders.

In the drawings, and referring first to the form of my invention illustrated in Figures 1 to 5 inclusive, the reference numeral 15 designates an internal combustion engine in a conventional manner; it being appreciated that my invention, regarded in its broader aspects, is applicable to all forms of internal combustion engine. The showing in the drawings, however, is intended to represent a multiple cylinder internal combustion engine having four cylinders, this being an ordinary type of internal combustion engine in extensive use.

The reference numeral 16 designates a carbureter which may be of any form and whereby a mixture of air and vaporized fuel is produced, the same flowing through an elbow 17 into and through the intake portion of my combined intake and exhaust manifold, which is designated as a whole by the reference character 18, and from the manifold through ports or openings adapted to register with the intake passages 19, 20 of the engine, each of which supplies two cylinders in the particular type of engine illustrated.

Figure 3:
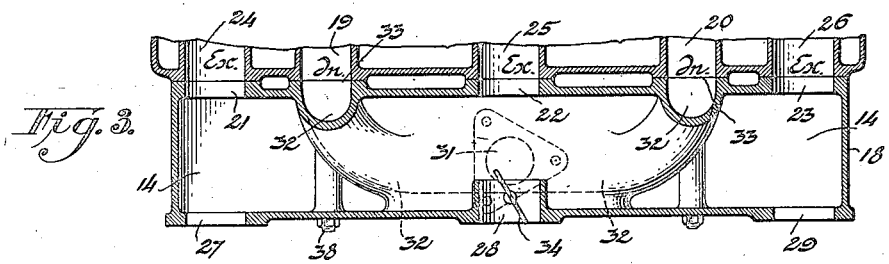
Figure 3 is a view showing my improved manifold and a portion of the engine in section upon a horizontal plane indicated by the line 3—3, Figure 2.
Figure 2:
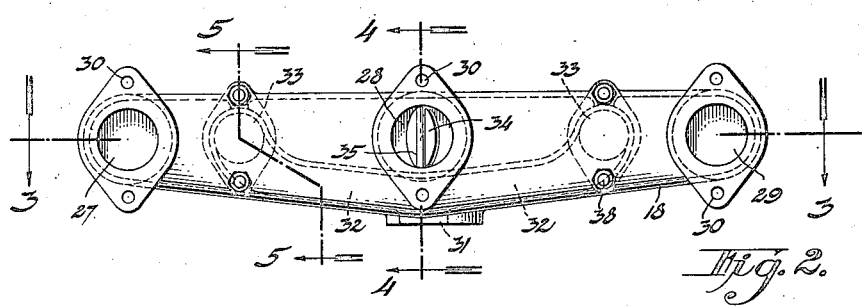
Figure 2 is a fragmentary view upon a larger scale showing my improved manifold apart from the engine.
Figures 4, 5:
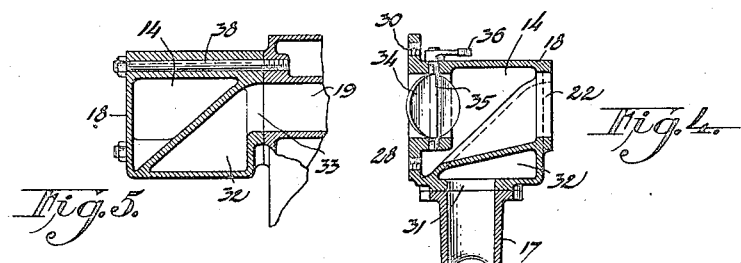
Figure 4 is a view showing a section upon a transverse plane indicated by the line 4—4, Figure 2.
Figure 5 is a view showing a transverse section upon a transverse plane indicated by the line 5—5, Figure 2.

The manifold 18 is made preferably from cast metal and is provided with a plurality of intake ports or openings 21, 22, 23 which register with a like number of exhaust passages 24, 25, 26 of the engine; and which ports lead into an internal chamber 14 within the manifold and extending from one end to the other thereof, as best shown in Figure 3. The middle exhaust passage 25 leads from two of the cylinders of the engine, and the outer passages 24, 26 lead one from a single cylinder, as is usual in engines of the type chosen in illustrating my invention, whereby exhaust gas is discharged into the interior chamber 14 of the manifold at various points along the length thereof. The manifold is also provided with a plurality of outlet ports 27, 28, 29 which may discharge directly into the external atmosphere; but which are preferably connected with an auxiliary or supplemental exhaust manifold so as to discharge all the exhaust gas through a single conduit, and at a distance from the engine; said auxiliary manifold being secured to the manifold herein described by cap screws extending into holes 30 provided in flanges surrounding the outlet ports above referred.

The outlet ports 27, 28, 29 are preferably located in line with and directly opposite the inlet ports 21, 22, 23 so that a free flow of exhaust gas may occur from each exhaust passage 24, 25, 26 directly through the internal chamber 14 of the manifold with a minimum of heating effect as regards the inflowing combustible mixture; which enters the manifold through a port 31 communicating with the elbow 17 and which mixture flows to the engine through passages 32, 32 the walls of which are integral with the external wall of the manifold, and which walls are common to the said passages 32 and to the interior chamber 14 of the manifold; the combustible mixture passing from the passages 32 through ports 33 at the ends thereof and into the intake passages 19, 20. In the embodiment of my invention illustrated the intake ports 21, 22, 23 and the ports 33 through which the combustible mixture flows to the engine are arranged in alternation, and are all in one and the same plane; and the outlet ports 27, 28, 29 are likewise all in one plane which extends parallel with the plane first above referred to, and is spaced apart therefrom the thickness of the manifold structure. These, however, are features which may be modified; as my invention, regarded in its broader aspects, is not limited to the features of construction here enumerated nor to the particular embodiment thereof illustrated and herein described except to the extent that such limitation may be necessitated by the language of the concluding claims.

Valve mechanism is provided for controlling the flow of exhaust gas from the internal chamber 14 outwardly therefrom and to the external atmosphere to thereby vary the heating effect of the exhaust gas upon the inflowing combustible mixture, it being obvious that the least heating effect occurs when the exhaust gas passes in straight lines, and with the least possible restraint, from the exhaust passages 24, 25, 26 directly through aligned ports 27, 28, 29 as shown; whereas when such a free outward flow of the exhaust gas is restrained the heating effect thereof is increased. I preferably control the heating of the combustible mixture by providing a single butterfly valve 34 carried by a shaft 35 having an arm 36 at its upper end to which a rod 37 which extends from the driver's seat is connected. This valve when in its open position will offer but slight obstruction to the flow of exhaust gas through the port 28 in which it is located, with a resulting free flow of exhaust gas through each of the ports 27, 28, 29 and a minimum heating effect of the exhaust gas as a whole upon the inflowing combustible mixture. When, however, said valve is turned partially or entirely across the port which it controls a greater or less portion of the exhaust gas flowing through the passage 25 and, in the embodiment of my invention illustrated, coming from two cylinders, is diverted toward the outer ends of the manifold and flows therefrom along with the exhaust gas from the passages 24, 26 through the ports 27, 29. This diversion of the exhaust gases and the causing of them to flow in more intimate relationship with the mixture inlet passages 32, 32 results in increased heating of said conduits or passages, and of the combustible mixture flowing therethrough; the heating being due in part to contact of gas flowing through the passage 25 with said passages 32 and in part to the retaining of exhaust gas within the chamber 14 due to the obstruction or partial obstruction of one of the ports, such as the port 28, through which the exhaust gas flows from said chamber when the flow through the said port 28 is not throttled, thus giving the gas more time within which to impart its heat to the inflowing combustible mixture.

It will be appreciated that the heating effect is always under the control of the operator and that the adjustment of the valve is in no sense limited to two positions, one for use at starting and the other after the engine has become heated; and the temperature of the inflowing combustible mixture should, in the proper operation of the engine, be regulated by manipulating the valve 34 so as to normally permit a sufficient quantity of exhaust gas to flow through the port 28 to prevent too high heating of the combustible mixture, while at the same time maintaining a proper temperature and a complete vaporization, without superheating, of the mixture flowing to the engine.

The combined intake and exhaust manifold as a whole is illustrated as secured to the engine by means of bolts 38 extending through passages provided in the manifold, although the method of securing the manifold in place is of secondary importance; and it will be appreciated that the results above referred to as regards the control of the heating of the inflowing combustible mixture may be accomplished by means of valves acting to restrict the flow through the end ports 27, 29, instead of through the middle port 28; the result being precisely the same in both cases so far as regards the effect upon the exhaust gas and the causing of the same to flow past the intake passages 32, as well also as regards the restriction of flow of exhaust gas from the chamber 14 and the holding of the same back, as it were, within the said chamber so as to secure a more complete transfer of heat therefrom to the inflowing combustible mixture.

In the form of my invention illustrated in Figures 6 to 10 the combined intake and exhaust manifold as a whole is designated by the reference numeral 40, and the internal chamber thereof by the reference numeral 13; said chamber being placed in communication with the exhaust passages in the engine, and having exhaust ports of the same form, construction and operation and having the same reference numerals applied thereto, as in the form of my invention first herein described. In this second form of my invention, however, the mixture of atomized air and fuel formed by the carbureter flows through an inlet conduit which is bifurcated to form two diverging arms or branches 42, 42 which extend through the internal chamber 13 of the manifold; the mixture entering the said intake conduit through an inlet port at 41 and flowing therefrom through ports 43, 43 which register with the combustible mixture supply passages 19, 20 of the engine. In this form of my invention when the valve 34 is open the exhaust gas flowing through the passages 24, 25, 26 and the ports 21, 22, 23 flows directly across the chamber 13, and out through the outlet ports 27, 28, 29; whereas when said passage 28 is partially or entirely closed by the valve 34 varying portions of the exhaust gas which enter the chamber 13 through the middle passage 25 are diverted, and caused to flow toward the ends of the manifold, during which they come in intimate contact with the portions of the supply conduits 42, 42 which are within the chamber 13; thereby heating the combustible mixture flowing through said passages, as will be appreciated. In this form of my invention the heating of the combustible mixture is always under the control of the operator through and by means of the valve 34, the same as in the form of my invention hereinbefore described, and in each case the manipulation of the said valve should be such from time to time as to secure a proper heating of the combustible mixture, while at the same time avoiding overheating thereof and reduction of volumetric efficiency of the engine due to inordinate expansion of the mixture.

Having thus described and explained my invention, I claim and desire to secure by Letters Patent:

1. A combined intake and exhaust manifold having an internal chamber, a plurality of inlet ports leading into said chamber and adapted to register with a like number of exhaust passages in an internal combustion engine, and a plurality of outlet ports located one in line with each of said inlet ports to thereby provide a plurality of substantially straight paths of flow of exhaust gas through said chamber, and through which ports exhaust gas may flow from said chamber; an inlet passage separated from said chamber by a common dividing wall and having a port adapted to communicate with a source of combustible mixture, and a second port located between the inlet ports aforesaid and adapted to register with an inlet passage in the engine; and a valve associated with one of said outlet ports and whereby the flow of exhaust gas therethrough may be controlled.

2. A combined intake and exhaust manifold having an internal chamber, a plurality of inlet ports leading into said chamber and adapted to register with a like number of exhaust passages in an internal combustion engine, and a plurality of outlet ports through which exhaust gas may flow from said chamber; an inlet passage separated from said chamber by a common dividing wall and having a port adapted to communicate with a source of combustible mixture, and a second port adapted to register with an inlet passage in the engine; and means associated with one of said outlet ports and whereby the flow of exhaust gas therethrough may be controlled.

3. A combined intake and exhaust manifold having an internal chamber, three inlet ports leading into said chamber and adapted to register with a like number of exhaust passages in an internal combustion engine, and three outlet ports located opposite and in line with said inlet ports and through which outlet ports exhaust gas may flow from said chamber; two inlet passages extending through said chamber so as to be heated by exhaust gas therein and having a common port adapted to communicate with a source of combustible mixture, and having each a second port; which second ports are located one upon each side of the middle one of the three inlet ports aforesaid, and between the same and the outer ports, and are adapted to register with two inlet passages in the engine; and a valve associated with the middle one of the outlet ports aforesaid and adapted to control the flow of exhaust gas therethrough.

4. A combined intake and exhaust manifold having an internal chamber, a plurality of inlet ports leading into said chamber and located all in a single plane and adapted to register with a like number of exhaust passages in an internal combustion engine, and a plurality of outlet ports located all in a second plane parallel with said first mentioned plane and through which exhaust gas may flow from said chamber; an inlet passage associated with said chamber so as to be heated by exhaust gas therein and having a port adapted to communicate with a source of combustible mixture, and a second port adapted to register with an inlet passage in the engine; and a valve associated with one of said outlet ports and adapted to control the flow of exhaust gas therethrough.

5. A combined intake and exhaust manifold having an internal chamber, a plurality of inlet ports leading into said chamber and located all in one plane and adapted to register with a like number of exhaust passages in an internal combustion engine, and a plurality of outlet ports located also in one plane and through which exhaust gas may flow from said chamber; an inlet passage associated with said chamber so as to be heated by exhaust gas therein and having a port adapted to communicate with a source of combustible mixture, and a second port adapted to register with an inlet passage in the engine; and means associated with one of said outlet ports and adapted to control the flow of exhaust gas therethrough.

6. A combined intake and exhaust manifold having an internal chamber, three inlet ports leading into said chamber and arranged in line and all in a single plane, and three outlet ports located opposite and in line with said inlet ports and all in a second plane parallel with said first mentioned plane; two inlet passages associated with said chamber so as to be heated by exhaust gas therein and having a common port adapted to communicate with a source of combustible mixture, and which passages are provided each with a second port; said second ports being arranged in alternation with the three inlet ports aforesaid, and in the same plane therewith; and a valve device adapted to control the flow of exhaust gas through said outlet ports.

7. A combined intake and exhaust manifold having an internal chamber, three inlet ports leading into said chamber, and three outlet ports located opposite and one in line with each of said inlet ports; an inlet conduit leading from a source of combustible mixture and bifurcated to provide two branches extending through said chamber so as to be heated by exhaust gas therein, and having each a port adapted to communicate with a combustible mixture supply passage of an engine; and which last mentioned ports are arranged in alternation with the inlet ports first herein mentioned, and in one and the same plane therewith; and a valve adapted to control the flow of exhaust gas through the middle one of the three outlet ports aforesaid.

8. A combined intake and exhaust manifold having an internal chamber, three inlet ports leading into said chamber and located one adjacent the middle and the others adjacent the ends of said manifold, and three outlet ports through which exhaust gases may flow from said chamber and which ports are located one adjacent the middle and the other adjacent the ends of said manifold; two inlet passages extending from a common source of combustible mixture through said chamber so as to be heated by exhaust gas therein, and which passages are provided each with a port adapted to register with two inlet passages in the engine, said two last mentioned ports and the three inlet ports first herein mentioned being arranged in alternation; and valve mechanism associated with the outlet ports aforesaid leading from said chamber and whereby the quantity of exhaust gas flowing from said chamber through said ports may be regulated.

In testimony whereof I affix my signature.

ALVARO S. KROTZ.